Jan. 19, 1965  R. B. KERSHNER ETAL  3,165,889
JET CONTROL BY ROTATABLE OFFSET NOZZLE
Filed Nov. 24, 1958  2 Sheets-Sheet 1
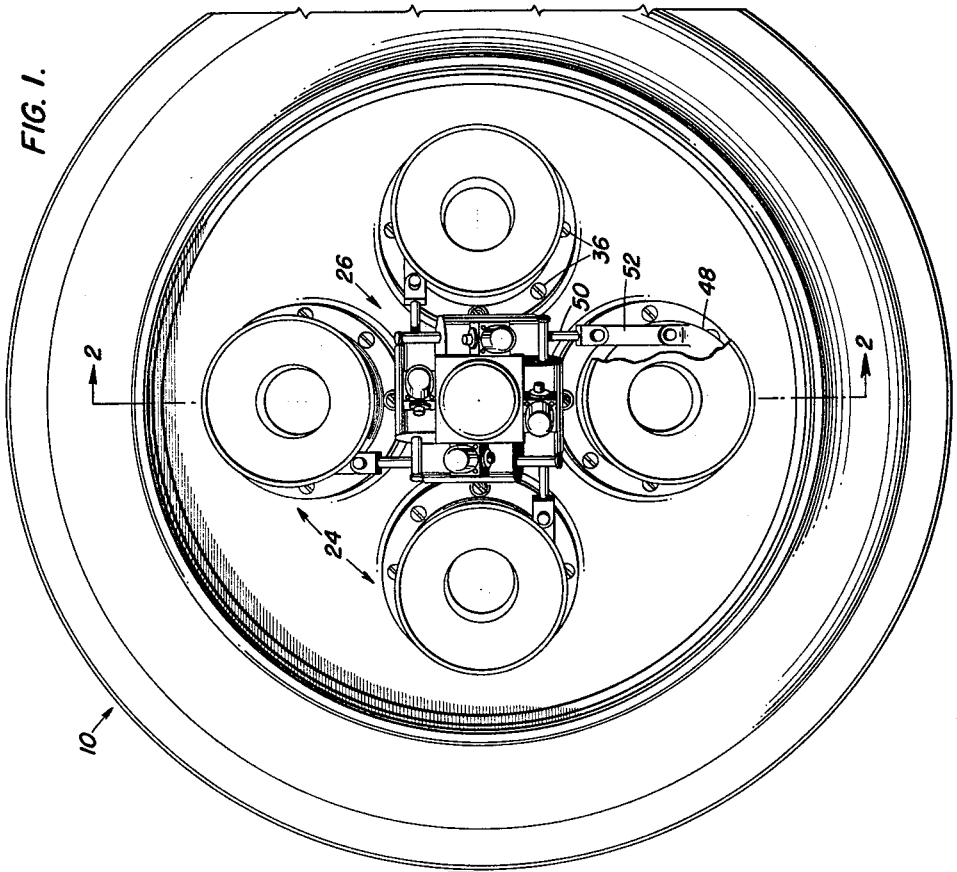
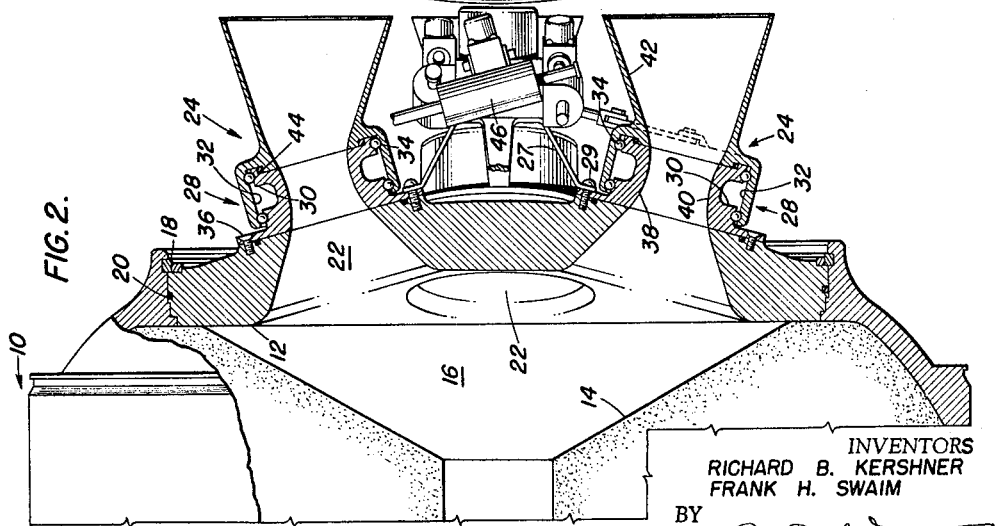
INVENTORS
RICHARD B. KERSHNER
FRANK H. SWAIM
BY
Q. Baxter Warner
Claude Funkhouser
ATTORNEYS

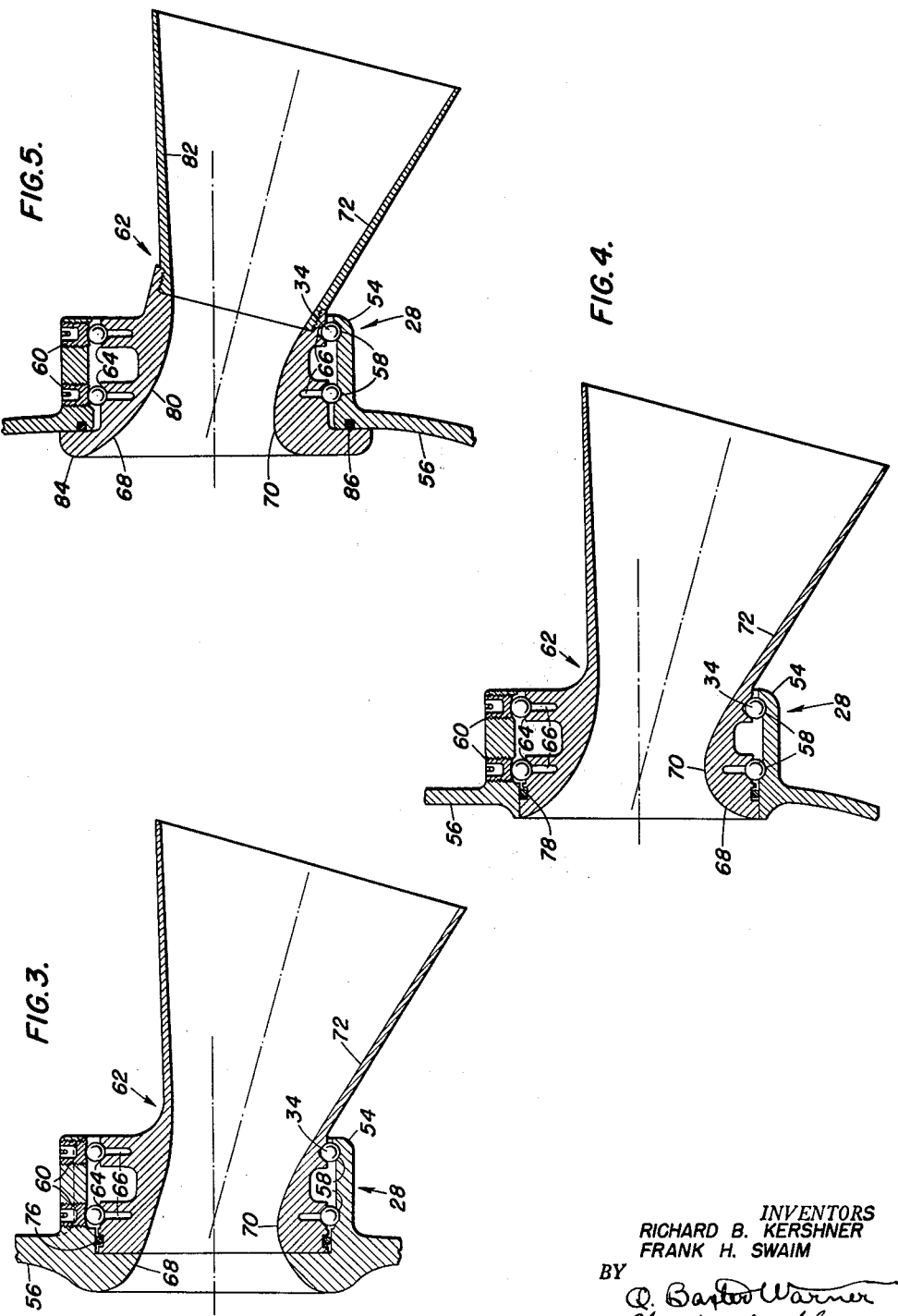

3,165,889
JET CONTROL BY ROTATABLE OFFSET NOZZLE
Richard B. Kershner and Frank H. Swaim, Silver Spring, Md., assignors to the United States of America as represented by the Secretary of the Navy
Filed Nov. 24, 1958, Ser. No. 776,154
1 Claim. (Cl. 60—35.55)

This invention relates to an aerodynamic control system for a missile and more particularly to the control of the roll, pitch and yaw attitudes of a missile by the rotation of canted primary thrust nozzles.

Until the last few years the field of long range missiles has been dominated by the liquid fuel approach primarily because of the advantages of liquid fuel missiles over solid fuel missiles, namely: high overall specific impulse from liquid fuel, simple thrust termination by stopping the fuel pumps, and simple thrust vector control by swiveling of the combustion chamber. Recently the solid fuel approach has advanced into a very favorable competitive position. That is, the overall specific impulse of solid propellant missiles has become competitive due to the development of aluminized propellants. Thrust termination has been accomplished very simply and effectively by the use of reverser ports explosively opened to provide reverse thrust at least equal to the forward thrust. Finally, effective thrust control for solid fuel rockets has been accomplished through the use of jet deflection devices.

Thrust vector control, of the above three advantages, is still the biggest obstacle of attaining a competitive position for a solid propellant missile. The most important of the various methods proposed for the control of the thrust vector pointing direction have been the following: jet vanes, jetavators, auxiliary jets, nozzle gas injection, nozzle oxidizer injection, swivel nozzles and swivel exit cones.

The jet vane is historically the oldest method used, having been used in the German V-2, but is not considered suitable for high performance applications because of the very serious erosion problem and the performance penalty of the constant drag due to its presence in the jetstream even when no control torques are required. Jetavators, though used successfully with low specific impulse propellants, present serious problems resulting from the high gas temperature and high aluminum content of the high specific impulse propellants. Notable among these problems is the tendency to immobilize the jetavators through the deposition of aluminum oxide on the jetavator surfaces.

Auxiliary jets, which provide torques to turn the entire missile and hence realign the main thrust vector, have been used successfully, but require the piping and valving of hot gases and the use of considerable propellant for this subsidiary jet which would be objectionable in a high performance missile. The nozzle gas injection technique, in which the main jet is deflected through the creation of a shock wave triggered by a gas flow injected laterally into the nozzle expansion cone section, suffers from the requirement for piping and valving as in the auxiliary jet system. Oxidizer injection, which deflects the main jet by injecting a cold oxidizer into the nozzle expansion cone and thereby establishes a shock front by further reaction in the exhaust gas, also requires valving and piping.

The swivel nozzle and swivel exit cone present the same problem which is to design a satisfactory swivel joint and seal. The swivel nozzle involves a difficult mechanical problem since it requires a ball and socket joint which is also difficult to seal. The swivel exit cone is a variant which attempts to reduce the problem of the seal and joint by moving the ball and socket joint to a position downstream of the nozzle throat where the pressure is greatly reduced. A further difficulty with the swivel nozzle is the variation in nozzle inlet conditions that accompanies the physical deflection of the nozzle.

The primary object of the present invention is to provide a plurality of canted nozzles which can be rotated to control the roll, pitch and yaw attitude of a missile.

A further object of the invention is to provide a canted rotatable nozzle which utilizes a straightforward rotary bearing.

A still further object of the invention is to provide a canted rotatable nozzle which may be rotated without altering the nozzle flow geometry.

Another object is to provide a canted rotatable nozzle which will be free from the effects of heat variations throughout its length for any position of rotation.

Another object is to provide a canted rotatable nozzle for the primary propulsive means in a missile, in which the pressure forces over the nozzle are balanced to reduce the bearing loads.

Other objects and many of the attendant advantages of this invention will be readily appreciated as the same becomes better understood by reference to the following detailed description when considered in connection with the accompanying drawings, wherein:

FIG. 1 is an end view of the present invention installed on a missile;

FIG. 2 is a transverse section on the line 2—2 of FIG 1;

FIG. 3 is a detail sectional view of one modification of the present invention;

FIG. 4 is a detail sectional view of a second modification of the present invention; and FIG. 5 is a detail sectional view of a third modification of the present invention.

Generally, the invention consists of a system utilizing rotatable nozzles each of which is canted with respect to the bearing axis to provide a single plane of thrust vector deflection. Four nozzles are mounted in the end cap of the missile so that when in a primary thrust position the axis of symmetry of the expansion section of the nozzle is parallel to the longitudinal axis of the missile and intersects the axis of rotation of the bearings at a fixed angle. Control of the attitude of the missile is achieved by either actuating opposite nozzles in pairs differentially or by actuating all nozzles in the same direction to produce turning moments on the missile.

The control system illustrated in FIGS. 1 and 2 comprises a missile 10 having an end cap 12, a propellant grain 14 and a combustion chamber 16. The end cap 12 is held in position by a snap ring 18 and is sealed from the combustion chamber 16 by a seal-ring 20. Apertures 22 are provided in the end cap 12 to connect the combustion chamber 16 with the thrust nozzles 24. An actuating mechanism 26 for the nozzles 24 is centrally mounted on the end cap 12. Two double row angular contact antifriction bearings 28 are mounted on the end cap 12 adjacent to the apertures 22 with the axes of rotation of the bearings meeting at a common point on the longitudinal axis of the missile. In FIG. 2 the bearing 28 is shown as having a stationary internal race 30, a rotatable external race 32 and two rows of ball bearings 34 positioned therebetween. The internal races 30 are secured to the end cap 12 by screws 36. The nozzles 24 consist of an approach section 38, a throat section 40 and an expansion section 42. The external races 32 and the expansion section 42 comprise a single unit in which the axis of rotation of the external race intersects the axis of symmetry of the expansion section at a predetermined angle. The approach section 38 and the throat section 40 are formed within the internal races 30 on a common central axis which is coincident with the central axis of the race 30. The external race 32 is mounted on the internal race 30 so that the axis of symmetry of the expansion section 42 will be parallel to the longitudinal axis of the missile at only one position of rotation, this position being the primary position. Any deviation from this position will produce lateral components of force due to the deflection of the jetstream which are used to stabilize the flight of the missile. A seal ring 44 is located intermediate the two races downstream from the ball bearings 34 to prevent the flow of combustion products into the bearing races.

The nozzles 24 are rotated by means of the actuating mechanism 26 which is mounted on a bracket 27 secured to the end cap 12 by screws 29. A hydraulic cylinder 46 is connected to a flange 48 on the external race 32 of nozzle 24 by means of a rod 50 and link 52. Each of the cylinders 46 is attached to the actuating mechanism 26 so that the central axis of each cylinder lies in a plane which is transverse to a plane passing through the axis of rotation of the bearing to which the cylinder is linked. This arrangement allows for overlapping of the rods 50 and increases the compactness of the unit.

In operation, four of the above nozzles 24 are mounted in the end cap 12 of the missile 10 in such a way that the axis of symmetry of the expansion section 42 is parallel to the longitudinal axis of the missile 10 and the axes of rotation of the bearings 28 all intersect at a common point on the axis of the missile. It can be readily seen that in the installation position described, which is the primary thrust position for the nozzles, there are no control torques applied to the missile 10 since all jets are parallel to the longitudinal axis of the missile and the four equal jets are symmetrically spaced with respect to this axis. If the expansion sections 42 of two opposite nozzles 24 are rotated equally and in opposite directions it is readily seen that the jets will be deflected in such a way as to produce an effective turning moment (yaw or pitch) on the missile. Turning opposite nozzles 24 in the same rotary sense will produce effective roll moments. For small deflections the motion of these nozzles 24 approximate the motion of the conventional swivel nozzle. Actually, since the end of the expansion section 42 moves in a circle about the axis of the bearing 28 in addition to the desired effective deflection corresponding to the motion of a swivel there is a small outward motion creating an undesired thrust deflection from two opposite nozzles which oppose and cancel each other so that in fact equal and opposite rotation of an opposite pair of nozzles 24 produces pure pitch or yaw torques even for relatively large rotations. In the same way equal and similarly sensed rotations of an opposite pair of nozzles produces pure roll torque; in this case the effect of the undesired outward deflection is simply to reduce the roll effectiveness of a given displacement.

In FIGS. 3, 4 and 5, modified nozzle arrangements are shown which may be used with the disclosed system. The anti-friction bearing 28 used in these arrangements has a stationary member 54 shown as being an integral part of an end cap 56 of the missile. The stationary member 54 has the bearing races 58 provided on its interior surface and openings 60 communicating with the races for installing the ball bearings 34. The nozzles 62 also have two races 64 provided on their exterior surfaces and grooves 66 adjacent these races to compensate for expansion of the nozzle due to the heat differential occurring between the interior and exterior surfaces of the nozzle. In place of the internal grooved races 66, a pair of deflecting rings (not shown) may be substituted to compensate for nozzle expansion.

In FIG. 3 the nozzle 62 has an approach section 68, throat section 70 and expansion section 72. The central axis of the approach section 68 is coincident with the axis of rotation of the nozzle race 64 and intersects the axis of symmetry of the expansion section 72 at a point upstream from the throat section 70. The upstream end of the nozzle is seated against a flange 54 provided in the end cap 56 and a circumferential seal-ring 76 prevents the flow of combustion gases to the bearing 28.

In FIG. 4 the nozzle 62 has an approach section 68, a throat section 70 and an expansion section 72 positioned along a common axis. The nozzle race 64 is provided on the upstream end of the nozzle on an axis of rotation which intersects the axis of symmetry of the nozzle at a fixed angle of from 10° to 20°. The nozzle race 64 is positioned in the stationary race 58 provided on the end cap 56 of the missile and the ball bearings 34 inserted through openings 60. A circumferential seal 78 is provided upstream from the ball bearings 34 to prevent the flow of combustion gases to the bearing.

In FIG. 5 the nozzle 62 has the approach section 68, throat section 70 and expansion section 72 on a common axis, and the bearing race 64 on an axis of rotation which is at an angle to the nozzle axis. The nozzle is composed of an upstream member 80 and downstream member 82. The upstream member 80 includes the approach section 68, throat section 70, nozzle race 64 and a flange 84 which seats against the interior surface of the end cap 56. A radial seal 86 is set in the interior wall of the end cap 56 adjacent to the flange 84. The downstream member 82 includes the expansion section 72 of the nozzle and is attached to the upstream member 80 by any convenient means. The upstream member 80 is inserted into the stationary bearing race 58 and ball bearings 34 are inserted through openings 60 into the races. The downstream member is then attached to the upstream member.

Obviously many modifications and variations of the present invention are possible in the light of the above teachings. It is, therefore, to be understood that within the scope of the appended claim the invention may be practiced otherwise than as specifically described.

What is claimed is:

In a reaction propelled missile, an attitude control device for said missile, said missile having an end cap on its aft end, said end cap having apertures arranged in diametrically opposed pairs, said control device comprising; an even plurality of primary thrust nozzles arranged in diametrically opposed pairs on said end cap in registry with said apertures and each having an expansion section, an approach section and a throat section, bearing means on the expansion section and having a stationary race attached to the end cap and an outer race secured to the expansion section, ball bearings between the races and a seal for preventing fluid flow to the bearings, said bearings rotatably mounting each of said nozzles on said end cap in a symmetrical array about and radially spaced from the longitudinal axis of said missile, the axes of rotation of said bearing means intersecting the longitudinal axis of said missile at a common point, and each said axis of rotation intersecting the axis of symmetry of its respective nozzle expansion section at an angle equal to the angle between said axis of rotation and said longitudinal axis, and means mounted on said end cap and connected with the exterior of said nozzles for rotating said nozzle expansion sections about said axis of rotation in response to control signals from said missile, said last-mentioned means comprising an actuator mechanism consisting of a plurality of cylinders mounted in a cluster about the axis of the missile, diametrically opposed pairs of said cylinders being mounted between diametrically opposed nozzles, each of said cylinders having a rod and a link connecting said rod with the outer race of one of the bearings.

References Cited by the Examiner

UNITED STATES PATENTS

| | | | |
|---|---|---|---|
| 2,611,317 | 9/52 | Africano | 60—35.55 X |
| 2,621,871 | 12/52 | Robert | 102—50 X |
| 2,995,319 | 8/61 | Kershner et al. | 60—35.55 X |

FOREIGN PATENTS

| | | |
|---|---|---|
| 968,948 | 5/50 | France. |
| 1,025,827 | 1/53 | France. |
| 1,022,847 | 1/58 | Germany. |

SAMUEL LEVINE, *Primary Examiner.*

ARTHUR M. HORTON, ABRAM BLUM, *Examiners.*